(12) United States Patent
Canapa

(10) Patent No.: US 7,261,202 B1
(45) Date of Patent: Aug. 28, 2007

(54) CONVEYING DEVICE WITH HOLLOW UNIVERSAL JOINT

(75) Inventor: Richard A. Canapa, Humbird, WI (US)

(73) Assignee: NMC-Wollard, Inc., Eau Claire, WI (US)

( * ) Notice: Subject to any disclaimer, the term of this patent is extended or adjusted under 35 U.S.C. 154(b) by 0 days.

(21) Appl. No.: 11/422,971

(22) Filed: Jun. 8, 2006

(51) Int. Cl.
*B65G 21/14* (2006.01)
(52) U.S. Cl. ............... 198/812; 198/588; 414/346
(58) Field of Classification Search ........... 198/584, 198/588, 812; 414/332, 345, 346, 393; 244/137.1
See application file for complete search history.

(56) References Cited

U.S. PATENT DOCUMENTS

| | | | |
|---|---|---|---|
| 2,494,302 A | | 1/1950 | Mason |
| 4,474,287 A | * | 10/1984 | Thompson ............ 198/812 |
| 4,663,919 A | | 5/1987 | Stroh et al. |
| 4,733,767 A | | 3/1988 | Anderson et al. |
| 5,456,348 A | * | 10/1995 | Whetsel et al. ............ 198/812 |
| 5,584,376 A | | 12/1996 | Voldby |
| 6,032,781 A | | 3/2000 | Ballestrazzi et al. |
| 6,298,981 B1 | | 10/2001 | Hosch et al. |
| 6,422,785 B1 | | 7/2002 | Ruggles et al. |
| 6,467,606 B1 | | 10/2002 | Elent et al. |
| 6,481,563 B1 | | 11/2002 | Gilmore |
| 6,655,893 B2 | | 12/2003 | Kelly et al. |
| 6,755,296 B2 | | 6/2004 | Elwell |
| 6,845,859 B2 | * | 1/2005 | Grundl ............ 198/588 |
| 6,893,200 B2 | | 5/2005 | Thogersen |
| 7,033,125 B2 | | 4/2006 | Thogersen |
| 7,077,615 B2 | | 7/2006 | Thogersen |
| 7,150,383 B2 | * | 12/2006 | Talken ............ 198/588 |
| 7,156,604 B2 | | 1/2007 | Thogersen |
| 2003/0049107 A1 | | 3/2003 | Thogersen |

FOREIGN PATENT DOCUMENTS

WO    WO-2005/073110 A1    8/2005

OTHER PUBLICATIONS

POWERSTOW, Power Stow Rollertrack Conveyor—Technical data, Flexramp, Oct. 17, 2005, 3 pages, http://www.powerstow.com/rollertrack/technicaldata.html.

* cited by examiner

*Primary Examiner*—James R. Bidwell
(74) *Attorney, Agent, or Firm*—Anthony J. Bourget

(57) ABSTRACT

A conveying device comprising at least a first conveying element and a second conveying element, each of the first and the second conveying element comprising a wire harness box having opposing box plates, the wire harness box including a pair of front tabs and a pair of rear tabs, the front tabs extending from box plates generally normal to the rear tabs; and a cargo roller positioned above the wire harness box; and a universal joint having at least two degrees of freedom, the universal joint including a rectangular hollow yoke, each of the front tabs of the at least first conveying element and each of the rear tabs of the second conveying element rotatably fastened to the yoke.

20 Claims, 16 Drawing Sheets

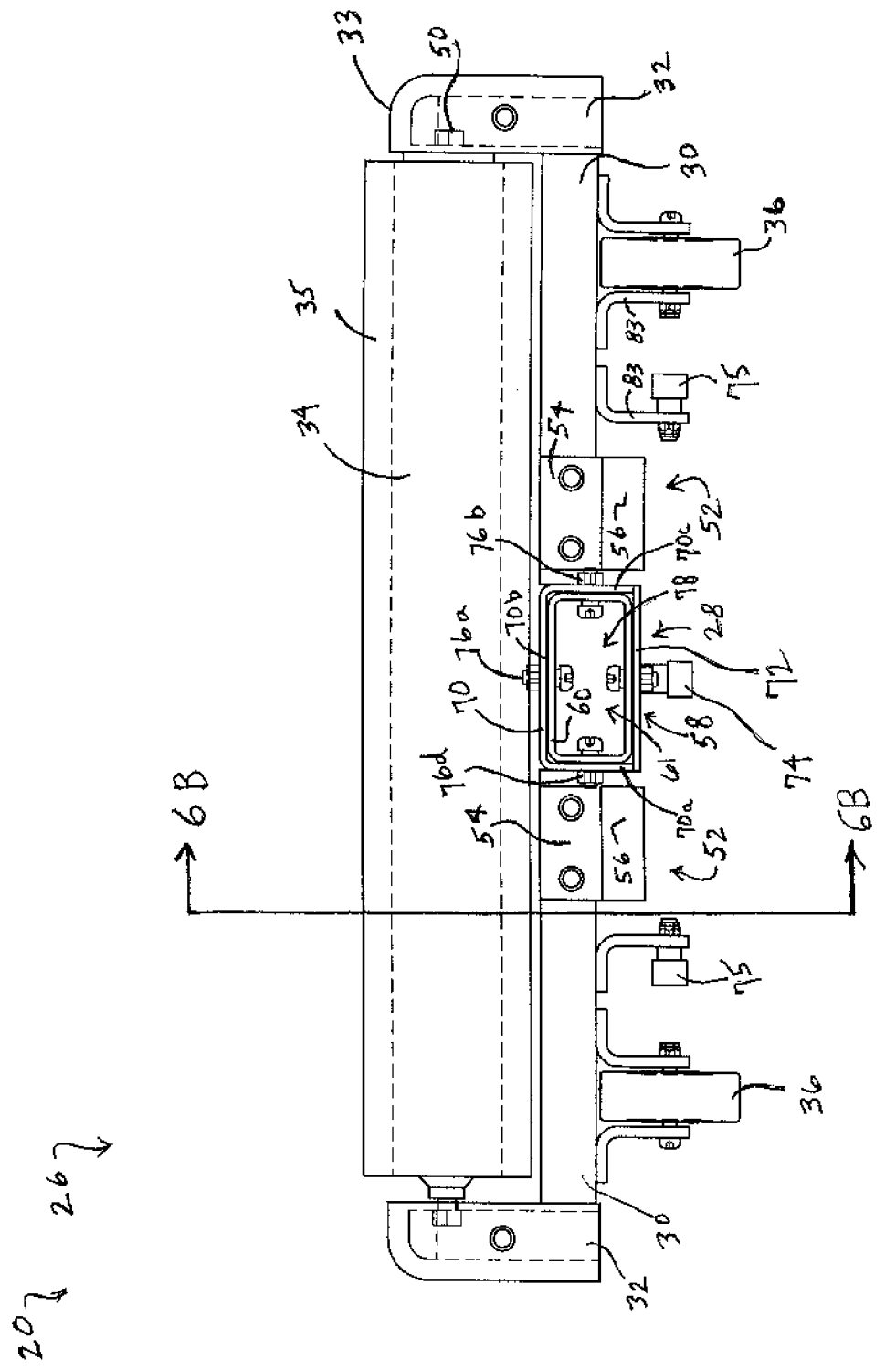

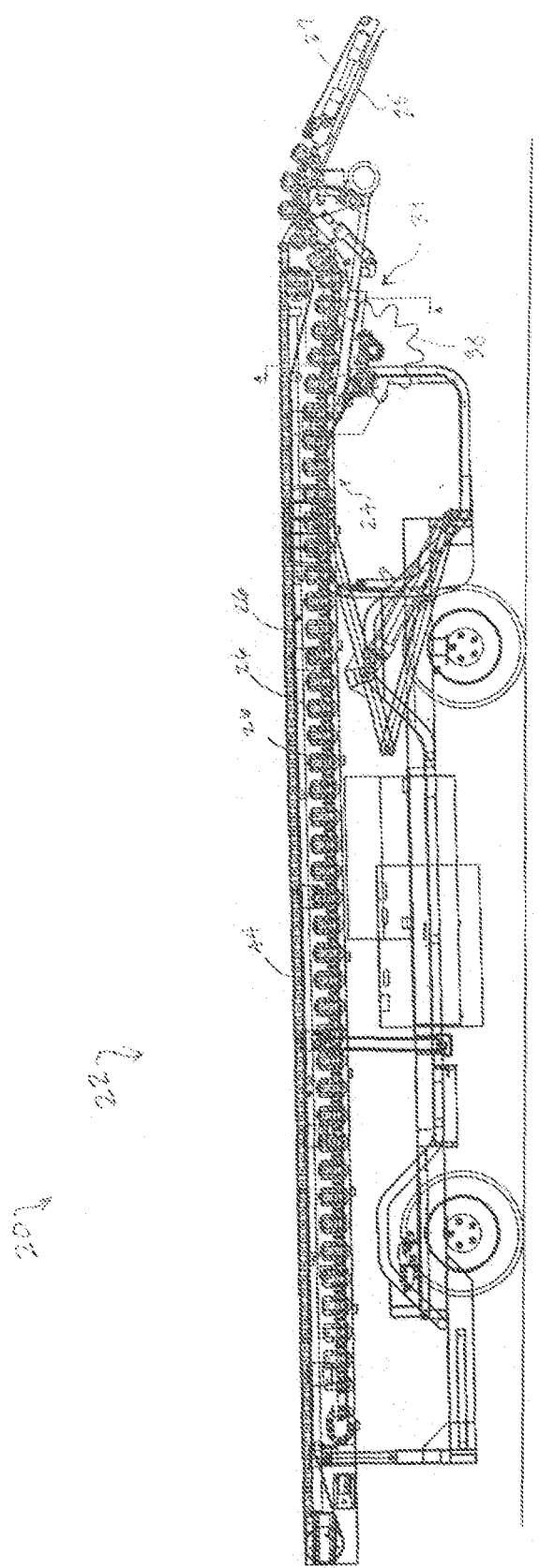

CONVEYING DEVICE WITH HOLLOW UNIVERSAL JOINT

BACKGROUND OF THE INVENTION

1. Field of the Invention

The present invention relates generally to conveying devices, and more specifically to conveying devices having a universal joint connecting individual conveying elements that may be extended from and retracted into the conveying device, and particularly to hollow universal joints for use with retractable conveyor elements of an aircraft baggage loader.

2. Background Information

Baggage loading devices are common. A typical device includes a vehicle equipped with an endless belt upon which luggage or other items are placed. Movement of the belt conveys the luggage from one end of the vehicle to the other end. An airplane loading vehicle preferably elevates at an angle so the luggage is transported from a lower level and into higher positioned cargo area of the airplane. In some instances add-on conveyors are included with the main belt-driven loader.

One example of such an add-on conveyor is found in U.S. Pat. No. 5,584,376 to Voldby. The add-on conveyor in Voldby is generally positioned in a retracted state beneath the main belt loader of the apparatus. The conveyor may be extended into the cargo compartment of the aircraft. A user manually pushes the conveyor into position while an assistant in the cargo compartment guides the end of the conveyor. The conveyor can be withdrawn progressively by manually pulling the conveyor from the outside in the opposite direction. At least a certain number of the rollers of the conveyor may include driving means to power the rollers which in turn convey baggage or other items. The conveyor includes a flexible driving means, such as a cardan chain, which has two degrees of freedom, one along the curve and the other up/down in relation to a horizontal plane. Examples of such chain include the type "Uni-slat top" or "Uni-Flex", both from the firm Uni-Chains Int. A/S Vejle, Denmark. A chain of the latter type essentially consist of Y-shaped chained links, linked together so that the chain can be curved like a bike chain, but can also be bent sidewards in a curve. The slat-variety includes elements with a slat of flattened surface that are linked together and have similar movement as a Y-shaped variety. Neither include a hollow opening disposed for running of cables within the chain-like structure.

Another example of a conveyor device is found in PCT Application Publication No. WO 2005/073110 A1 entitled Conveying Device, by Martin Vestergaard, published Aug. 11, 2005. The conveyor device in that application includes a variety of mechanisms for articulation of respective conveying elements. The device also includes an embodiment where the conveying device of that invention is arranged underneath the device for transporting the luggage from the cargo hold to the luggage trolley placed on the ground. This is done by arranging a box-like structure underneath the conveyor such that the conveying device according to that disclosure can slide out of and into that box-like structure. For that purpose, a guide rail is arranged inside the box such that the chain box elements 4 of the conveying device according to that disclosure may by means of guidance rollers roll inside the guide rail such that it is relatively easy to eject or insert the conveying device into the conveyor. While the device of Vestergaard shows a hollow chain box 4 as indicated in prior art FIG. 15 by reference number 43 for placing different means for powering the rollers, wires etc. (which FIG. 15 generally corresponds to FIG. 15 of the Vestergaard PCT application), such particular structure of FIG. 15 or disclosure does not show a universal joint for articulation to achieve two degrees of freedom.

Another example of a conveyor device in use outside the United States and generally demonstrated at www.powerstow.com includes a retractable conveyor having multiple rollers. This device is marketed by Power Stow A/S of Denmark under the name Rollertrack. There is no disclosure of the conveyor units having a yoke for articulation to achieve two degrees of freedom or to swivel about two axes.

Other examples of conveyor devices having a retractable conveyor are found in U.S. patent application Ser. No. 10/169,361 to Thogersen, publication No. US 2003/0091415, and U.S. patent application Ser. No. 10/720,471, publication No. US 2004/0105740. These applications show a retractable conveyor constructed for storing in a generally folded configuration. The retractable conveyor units include an endless belt. In one embodiment, the moving of the conveyor units to and from the cargo compartment of an aircraft is carried out by means of a driving, endless conveyor belt which cooperates with the bottom side of the conveyor units, such as by way of friction; or the conveyor part is pushed and moved into the cargo compartment; or the invention is generally silent as to the particulars of how the conveyor units are driven or retracted or extended. The pivoting of respective conveyor units in two degrees of freedom requires a complicated design and accommodates pivoting in limited direction. For instance, the individual conveyor units pivot in a bottom-to-bottom relationship but do not freely pivot in a top-to-top relationship (i.e., they fold downward (bottom-to-bottom) with respect to each other but there is no showing that they fold top-to-top, or upward with respect to each other).

The present invention, however, provides a novel conveying device and advantages over prior designs. The device includes a hollow universal articulating joint for increased performance. Numerous other advantages and novel features of the present invention are disclosed.

SUMMARY OF THE INVENTION

The present invention is directed toward a conveying device comprising at least a first conveying element and a second conveying element, each of the first and the second conveying element comprising a wire harness box having opposing box plates, the wire harness box including a pair of front tabs and a pair of rear tabs, the front tabs extending from box plates generally normal to the rear tabs; and a cargo roller positioned above the wire harness box; and a universal joint having at least two degrees of freedom, the universal joint including a rectangular hollow yoke, each of the front tabs of the at least first conveying element and each of the rear tabs of the second conveying element rotatably fastened to the yoke.

A further aspect of the invention includes a conveying device comprising at least a first conveying element and a second conveying element, each of the first and the second conveying element comprising a wire harness box and a cargo roller positioned above the wire harness box; and a universal joint having at least two degrees of freedom, the universal joint connecting the wire harness box of the first conveying element with the wire harness box of the second conveying element.

A further aspect of the invention includes a conveying device comprising a base; a retractable conveyor extendable from the base, the conveyor comprising: at least a first conveying element and a second conveying element, each of the conveying elements comprising a wire harness box having opposing box plates, the wire harness box including a pair of front tabs and a pair of rear tabs, the front tabs extending from box plates generally normal to the rear tabs; and a cargo roller positioned above the wire harness box; and a universal joint having at least two degrees of freedom, the universal joint including a rectangular hollow yoke, each of the front tabs of the at least first conveying element and each of the rear tabs of the second conveying element rotatably fastened to the yoke.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 2 is a front elevation view of a conveyor and conveying element of the present invention.

FIG. 3A is an elevation view of a conveyor of FIG. 1 with a retractable conveyor portion retracted and with portions of a base conveyor removed for clarity.

Figure 1:
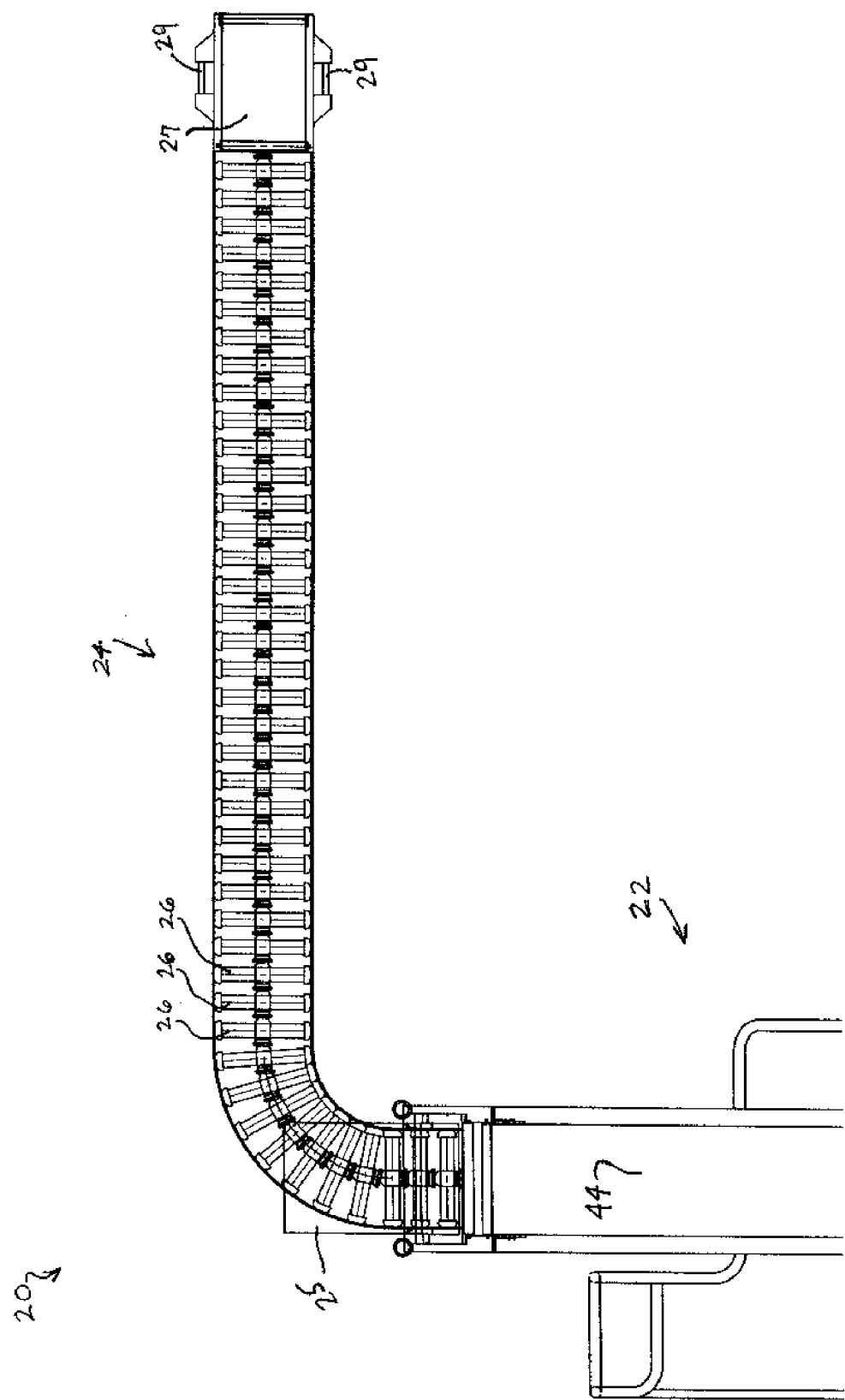
FIG. 1 is a plan view of a conveyor made in accordance with the present invention.

While the invention is amenable to various modifications and alternative forms, specifics thereof have been shown by way of example in the drawings and will be described in detail. It should be understood, however, that the intention is not necessarily to limit the invention of the particular embodiments described. On the contrary, the intention is to cover all modifications, equivalents, and alternatives falling within the spirit and scope of the invention and as defined by the appended claims.

DETAILED DESCRIPTION OF THE INVENTION

The invention is directed to a portable conveyor comprising an inclining base having a conveyor belt, a plurality of articulating conveying elements having powered cargo rollers defining a conveying device transport plane, the conveying elements extendable from and retractable into the base by drive means. The conveying device preferably includes a plurality of conveying elements connected via a hollow universal joint having at least two degrees of freedom. The hollow joint allows for wires to be provided through the joint and through the wire harness box to power cargo rollers. The two degrees of freedom allow the conveying elements to be stored underneath a belt conveyor and swivel about a track to accommodate extraction and retraction of the conveying elements and to allow for desired positioning within a cargo area of an aircraft, for instance.

Referring now to FIG. 1, a conveyor according to the present invention is generally depicted with reference to numeral 20. In one aspect, conveyor 20 includes a base 22 and a retractable conveyor 24. Base 22 is preferably a belt conveyor as is common in the aircraft ground support equipment environment. Typically base 22 includes a conveyor belt 44 which typically includes an endless belt driven by a head stock pulley 46 and supported by multiple conveyor belt rollers 45. Belt 44 travels over return idler 47 as is commonly understood. A variety of conveyor belt devices may be used in conjunction with the present invention. While preferable, it may be appreciated that base 22 need not be limited to a conveyor belt mechanism.

In FIG. 1, retractable conveyor 24 is depicted in an extended position. It may be appreciated that conveyor 24 may be placed within the cargo hold of an aircraft for transport of cargo items (cargo not shown). Retractable conveyor 24 includes a number of conveying elements 26 which articulate with respect to adjacent elements 26 and accommodate extension of conveyor 24 into various positions. Conveyor 20 preferably includes a docking platform 25 intended to rest within the cargo hold area of an aircraft. Front end conveying element 27 is preferably positioned on platform 25 when in a retracted state. Each of conveyor 20, base or belt conveyor 22, retractable conveyor 24 and conveying element 26 are conveying devices as that term is used herein.

Referring to FIG. 2, conveyor 20 includes at least one conveying element 26. Conveyor element 26 includes a wire harness box 28 formed generally of a box channel plate 70 and box plate 72. Box channel plate 70 preferably is made of a material having a C-shaped cross section (i.e., a C-channel) having generally planar and generally rectangular sides 70a, 70b and 70c. Together with box plate 72, sides 70a, 70b, and 70c form a box-like structure having a box channel 78 running longitudinally therethrough. Box plate 72, sides 70a, 70b, and 70c are collectively referred to as box plates. Side 70b is preferably positioned opposite and parallel to side 72, while side 70b is preferably positioned opposite and parallel to side 70a. Alternatively, a hollow section channel tube may be used. Box channel plate 70 is generally U-shaped and when fitted with box plate 72 forms a generally rectangular channel 78 preferably running the length of wire harness box 28. Box channel 78 accommodates for running of power or control wires (not shown) the length of conveyor 20.

Conveying element 26 includes supporting rail 30. Preferably conveying element 26 has a pair of supporting rails 30 affixed on either side of wire harness box 28. Supporting rails 30 are preferably welded to wire harness box 28. Supporting rail 30 includes shoulder 32 which is preferably a channel or U-shaped and extends upwards from rail 30. Shoulders 32 on each end of conveying element 26 support cargo roller 34. Cargo roller 34 rotates to convey items such as cargo. Sleeve 35 is placed over cargo roller 34 for desired circumference and traction. Inside cargo roller 34 is a powering means, such as a motor (powering means and motor not shown) for rotating roller 34. Typically powering means is an electric motor. Wires (not shown) for powering electric rotation motor are fed through box channel 78, along supporting rail 30, along shoulder channel 32 and preferably through hollow bolt 50. Supporting rail 30 includes transport roller 36, generally affixed opposite cargo roller 34. Preferably conveying element 26 includes at least two transport rollers 36. Transport rollers 36 allow element 26 to roll upon an aircraft cargo bed (not shown) or other surface. Wire harness box 28 includes at least one guiding roller 74 which is configured to roll within guide rail 80 (see FIG. 5) and to align and guide conveying element 26 in an out of base 22. Supporting rail 30 preferably includes guidance rollers 75 which also roll within guide rail 80 to assure transport rollers 36 of conveying element 26 roll upon track 82 (see FIG. 5) of base 22. It may be appreciated that track 82 runs at least substantially the length of base 22. Preferably rectangular tube 85 is included to provide support to conveyor 22. Preferably UHMW material 87 (or other similar material) is positioned along the assembly of conveying elements 26 to accommodate smooth extraction/retraction. Preferably UHMW material has general dimension of ½ inch thick by 1½ inches wide and conveniently spaces or allows box 28 to be aligned. UHMW material 87 preferably runs the length of the assembly of elements 26 to prevent tipping and maintaining level positioning of elements 26.

Figure 6:
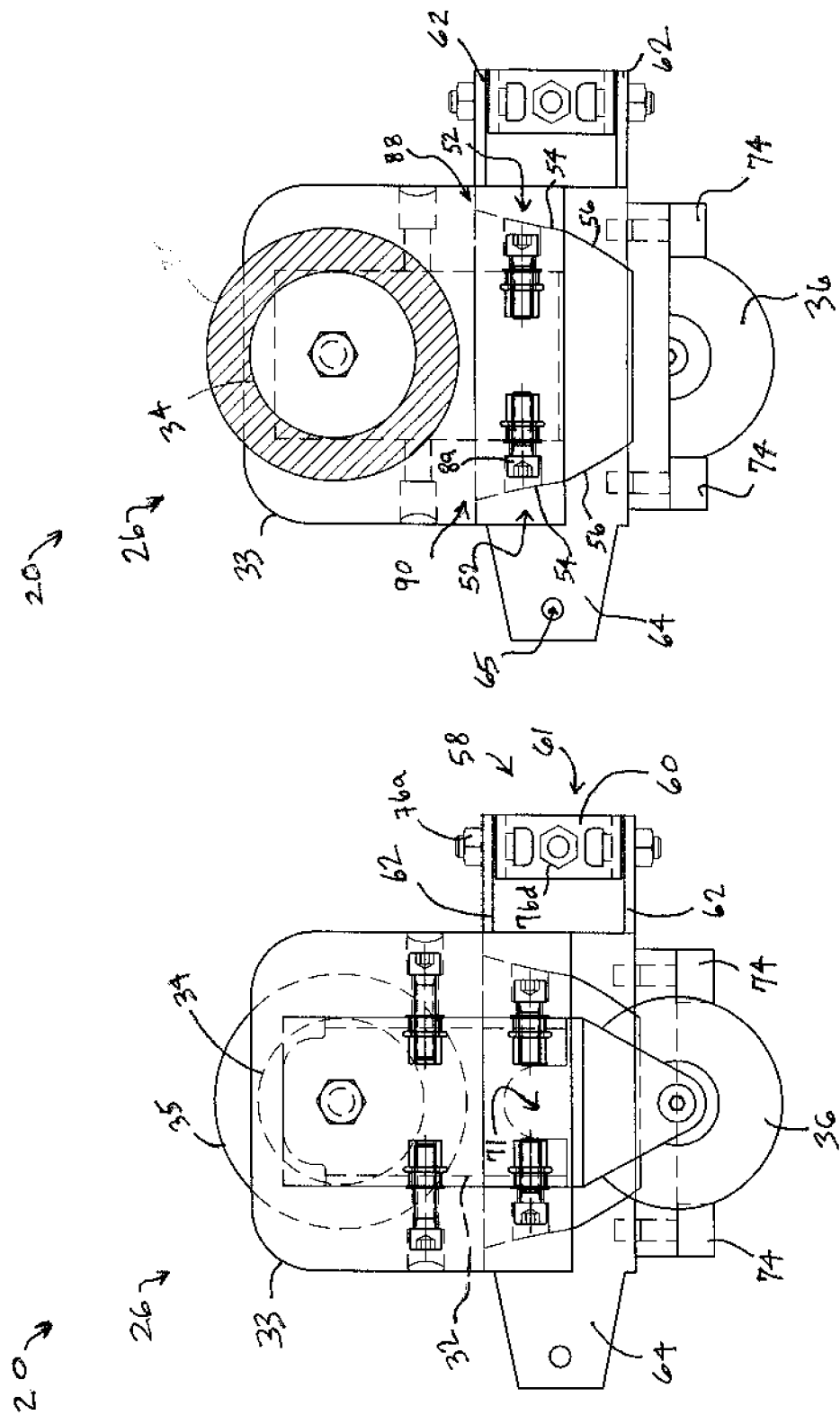
FIG. 6A is a left side elevation view of the conveyor and element of FIG. 2.
FIG. 6B is a section view taken along line 6B-6B of FIG. 2.

Conveying element 26 includes at least one rack tooth 52. Rack tooth 52 is preferably affixed to supporting rail 30. It may be appreciated that rack tooth 52 may be integrally connected with rail 30. As shown in FIG. 6B, rack tooth 52 includes rack wall 54 and rack lower wall 56. Preferably rack wall 54 has a concave cross-section and rack lower wall 56 has a convex cross-section. Such concave and convex cross-section accommodate for improved driving of conveying element 26 to retract or extract conveying element 26 from a base 22. Preferably rail 30 includes a rack tooth 52 at a front side 88 and at a rear side 90 of rail 30. More preferably rack tooth 52 is a single unit that wraps from front side 88 to rear side 90 of rail 30 as shown in FIG. 6B. Preferably rack tooth 52 is fastened into rail 30 with fastening means 89 such as a bolt or the like.

FIG. 3 is an elevation view of conveyor 20 with a retractable conveyor portion 24 retracted. Conveyor 20 includes base 22 which may preferably be a belt conveyor. Portions of a base conveyor have been removed for clarity. Multiple conveying elements 26 are stored beneath conveyor belt 44 and are extracted or driven by drive means 39. As shown in FIG. 4, drive means 39 includes a spur gear 38 having fingers 42. Adjacent conveying elements 26 define grooves 40. Finger 42 inserts into groove 40 and upon rotation of spur gear 38, drives a conveying element 26. Preferably finger 42 abuts rack tooth 52. As finger 42 rotates it preferably successively abuts both rack wall 54 and rack lower wall 56. Such action accommodates efficient driving of conveying elements 26.

Figure 5:
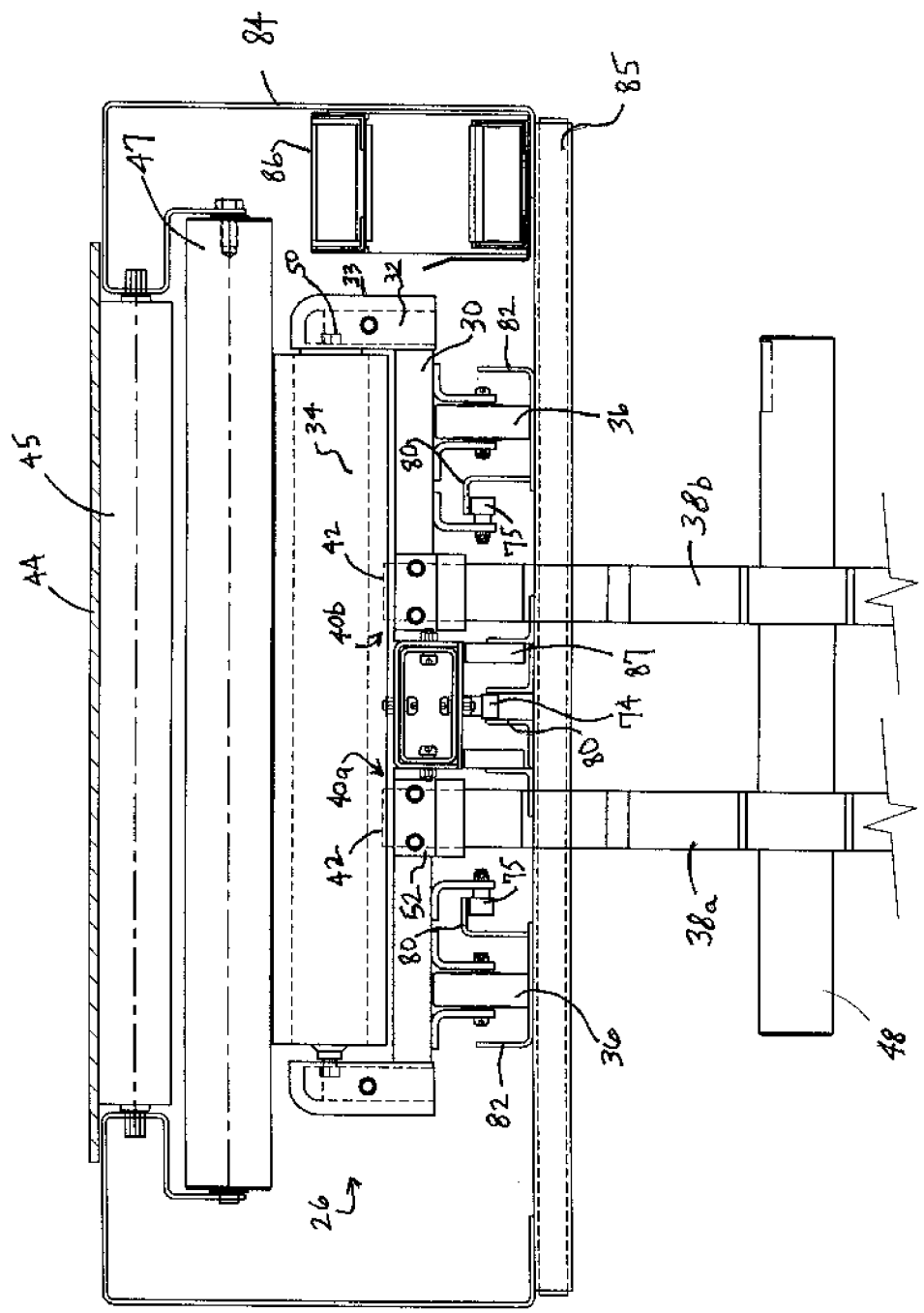
FIG. 5 is a section view taken along line 5-5 of FIG. 4

As shown in FIG. 5, conveyor 20 preferably includes two spur gears 38. Each spur gear engages with a respective series of rack teeth defined by the individual rack tooth 52 of conveying elements 26. Preferably each spur gear 38 is affixed to a spur gear shaft which is rotatably affixed to base 22. Preferably spur gear 38 has a generally square center bore to mate with shaft 48 which is preferably made of square stock to lock spur gear 38 and to keep spur gear 38 from slipping about shaft 48. Alternatively, shaft 48 may be rounded and configured with a hole and key slots and key as is commonly understood. Preferably spur gears 38a, 38b are spaced apart to engage rack tooth 52 on either side of wire harness box 28 to accommodate efficient driving of conveying elements 26.

While drive means 39 is preferably hydraulically powered, it may be appreciated that drive means may also be electrically powered. Preferably hydraulic drive means 39 includes a hydraulic motor and brake mechanism 92 to prevent back flow of elements 26 when conveyor 20 is in an elevated position. The brake 92 includes a brake release valve, which when hydraulically powered, allows for release of the brake and subsequent movement of the conveying elements 26.

Spur gear 38 may be made of a variety of metals or other items, and preferably spur gear 38 is made of a nylon type of ingredient such as those that may contain nylon and molybdenum disulphide such as Nylatron® GSM, or is made of phenolic or a synthetic resin type of material. Preferably fingers 42 are spaced apart or have a "pitch" generally shown by the arrow X of FIG. 4. Preferably the pitch is about 6 inches. Preferably spur 38 gear has a diameter of about 19 inches. Preferably spur gear 38 is positioned toward a front end of conveyor 20 to accommodate efficient extraction/retraction of conveyor 24.

FIG. 6A and FIG. 6B show conveyor 20 from an elevation view. FIG. 6A includes conveying element 26 with shoulder 32 extending generally upward from supporting rail 30. Preferably shoulders 32 are welded to rails 30. Shoulders 32 preferably include a wire channel 71 to receive wires running from wire harness box 28 to power cargo roller 34. Preferably at least two guiding rollers 74 are positioned on either side of transport rollers 36 to accommodate for efficient alignment within guide rail 80.

Conveyor 20 includes means for pivoting 58 about at least two and preferably three axes. Preferably each conveying element 26 includes a U-joint or universal joint 58 to accommodate for multiple degrees of motion so that elements 26 may articulate with respect to each other and from side-to-side and over surfaces having varying undulations. Preferably universal joint 58 is a "hollow" U-joint in that it has a hollow space to accommodate insertion of wires through conveying element 26. Preferably universal joint 58 includes means for pivoting, or yoke 60. Preferably yoke 60 has a generally rectangular cross section and a hollow center or yoke channel 61. More preferably yoke 60 is a tube-like structure. Preferably yoke 60 has an outer dimension less than or equal to an inner dimension of wire harness box 28 as shown in FIG. 2.

Figure 14A:
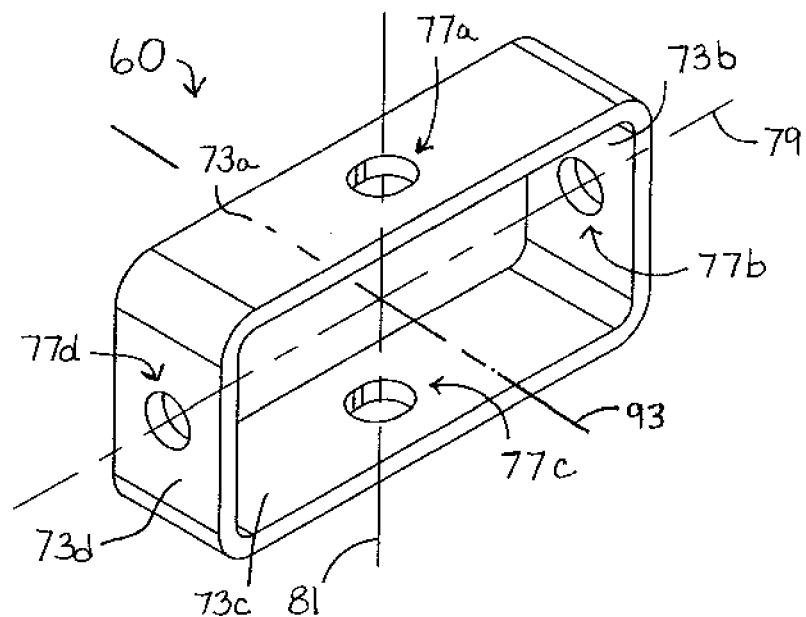
FIG. 14A is a perspective view of a yoke component of the present invention.

Yoke 60 is preferably a rectangular shaped swivel component having apertures 77a-77d located preferably on each of its four faces 73a-73d as generally shown in FIG. 14A. Preferably face 73a is opposite and parallel to face 73c, and face 73b is opposite and parallel to face 73d. Preferably each yoke face 73a, 73b, 73c, and 73d include an aperture 77 positioned substantially at a center portion of the respective faces 73. Axis 79, which is generally a horizontal axis, generally runs through apertures 77b and 77d; and axis 81, which is generally a vertical axis, generally runs through apertures 77a and 77c. Preferably axis 79 and axis 81 lie on a common plane. Positioning on a common plane accommodates for a more compact design of universal joint 58. More preferably axis 79 intersects with axis 81 at a center portion of yoke channel 61. Such centralized alignment accommodates for more efficient and more uniform swiveling of respective conveying elements 26. It may be appreciated that each pair of apertures accommodates insertion of fasteners 76a-76d to allow for pivoting about respective fasteners. For instance, fasteners 76a and 76c accommodate pivoting about vertical axis 81 to accommodate a generally side-to-side pivoting of respective elements 26. Such side-to-side pivoting is best shown in general along the curve of retractable conveyor 24 in FIG. 1. Fasteners 76b and 76d accommodate pivoting about a horizontal axis 79 to accommodate a generally up-and-down pivoting between respective elements 26. Such up-and-down pivoting is best shown in general in FIG. 4 as elements 26 curve vertically along track 82. This side-to-side and up/down motion of elements 26 is referred to as having two degrees of freedom, one along the curve and the other up/down in relation to a horizontal plane. More particularly, universal joint 58 has at least two degrees of freedom, and preferably three degrees of freedom (i.e., joint 58 pivots or allows for pivoting about at least two axes, and preferably three axes as stated below).

Figure 14B:
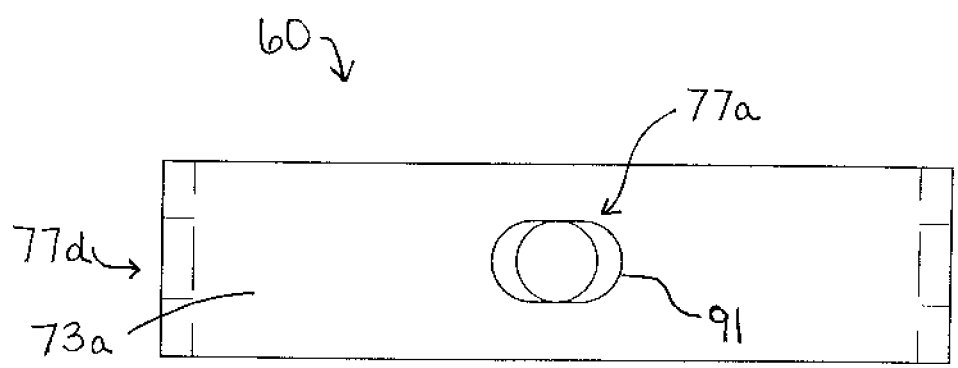
FIG. 14B is a top view of a further aspect of the yoke component.
Figure 15:
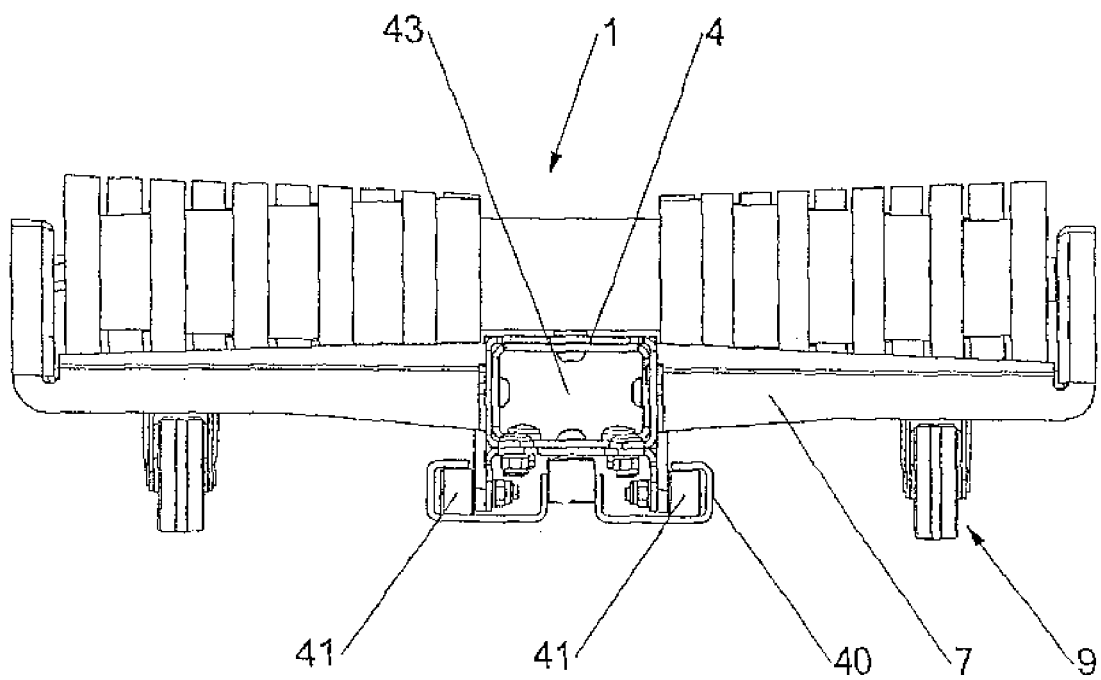
FIG. 15 is an elevation view of a prior art device.

As shown in FIG. 14B, yoke 60 preferably has opposing apertures 77a and 77c which lie generally on vertical axis 81. Preferably, apertures 77a and 77c are elongated or oval shaped or otherwise have a slot 91. Slot 91 is somewhat exaggerated in its scope of elongation for demonstration. Oval shaped apertures 77a and 77c allow conveying elements to rotate or twist about axis 93 which runs generally normal to axis 79 and axis 81, and generally longitudinally through center of yoke 60. Slot 91 allows for a third degree of freedom, namely rotational freedom. As such, conveying element 26 is allowed to rotate about the above-referenced longitudinal axis 93, and transport roller wheels 36 which lie on either side of wire harness box 28 may accommodate travel over varying or uneven surfaces by means of rotation or movements due to slot 91. It may be appreciated that slot 91 allows for a certain amount of "slop" and that rotation or movement is not confined to rotation or movements about axis 93 but may vary depending on the case. Preferably means for pivoting 58 and 60 accommodates range of motions of, for instance, up/down of plus/minus about 36 degrees, side-side of plus/minus about 12 degrees, and rotation of plus/minus about 2.4 degrees. It may be appreciated that side-side motion may be limited by bumpers 33.

Rotation about axis 79 allows adjacent conveyors 26 to be pivoted such that respective cargo rollers 34 may either draw closer together or further apart depending upon the undulation of rail 82 or of the undulation of a cargo hold, platform or other surface. It may be appreciated that use of such universal joint 58 may accompany a variety of conveying devices and is not limited to those devices having a drive means 39 as recited but may be used in conjunction with other mechanisms that might employ a worm drive or jack screw drive or other mechanism to extend conveying elements.

Figure 9:
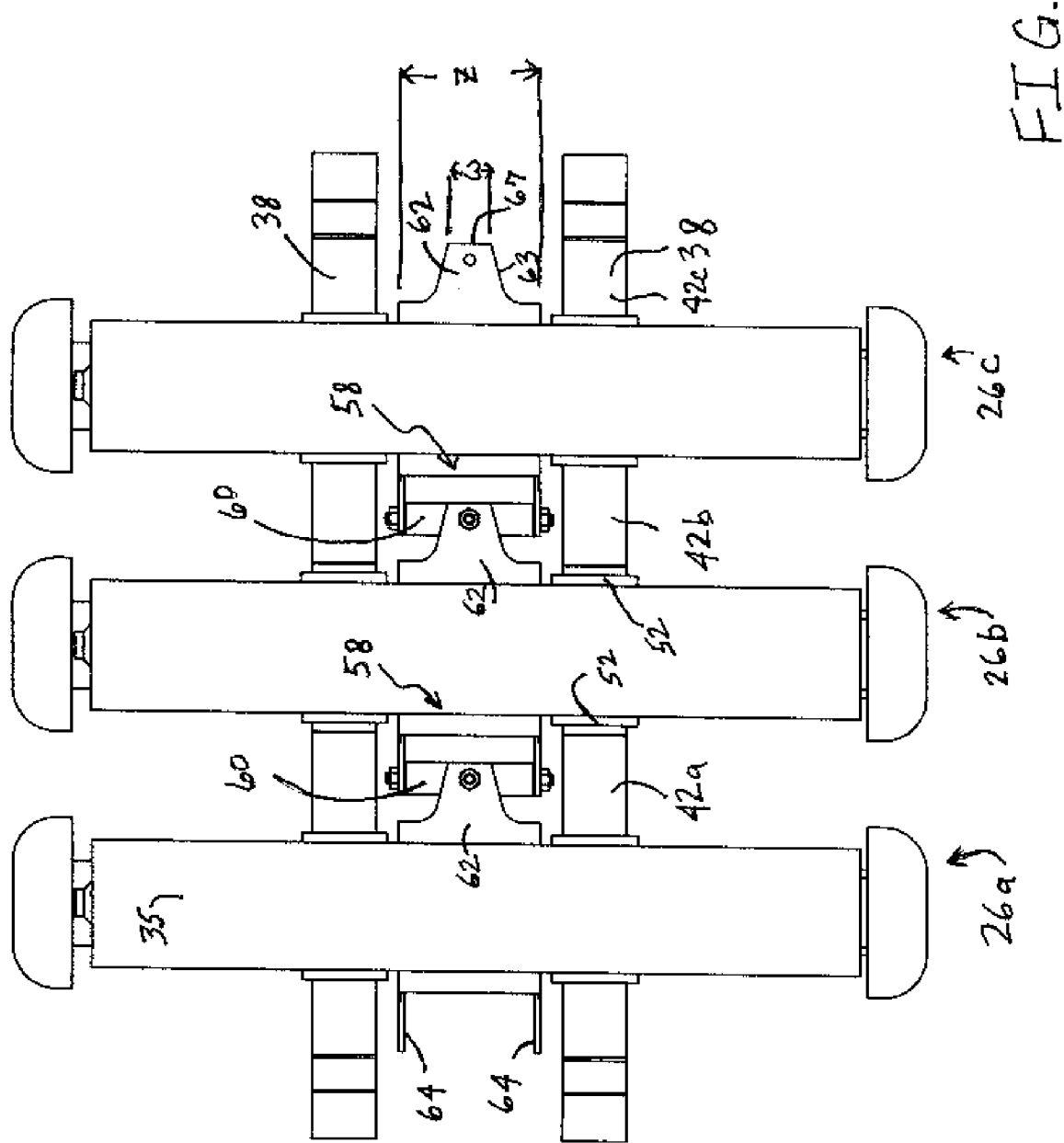
FIG. 9 is a partial plan view of the conveyor of FIG. 8.
Figure 10:
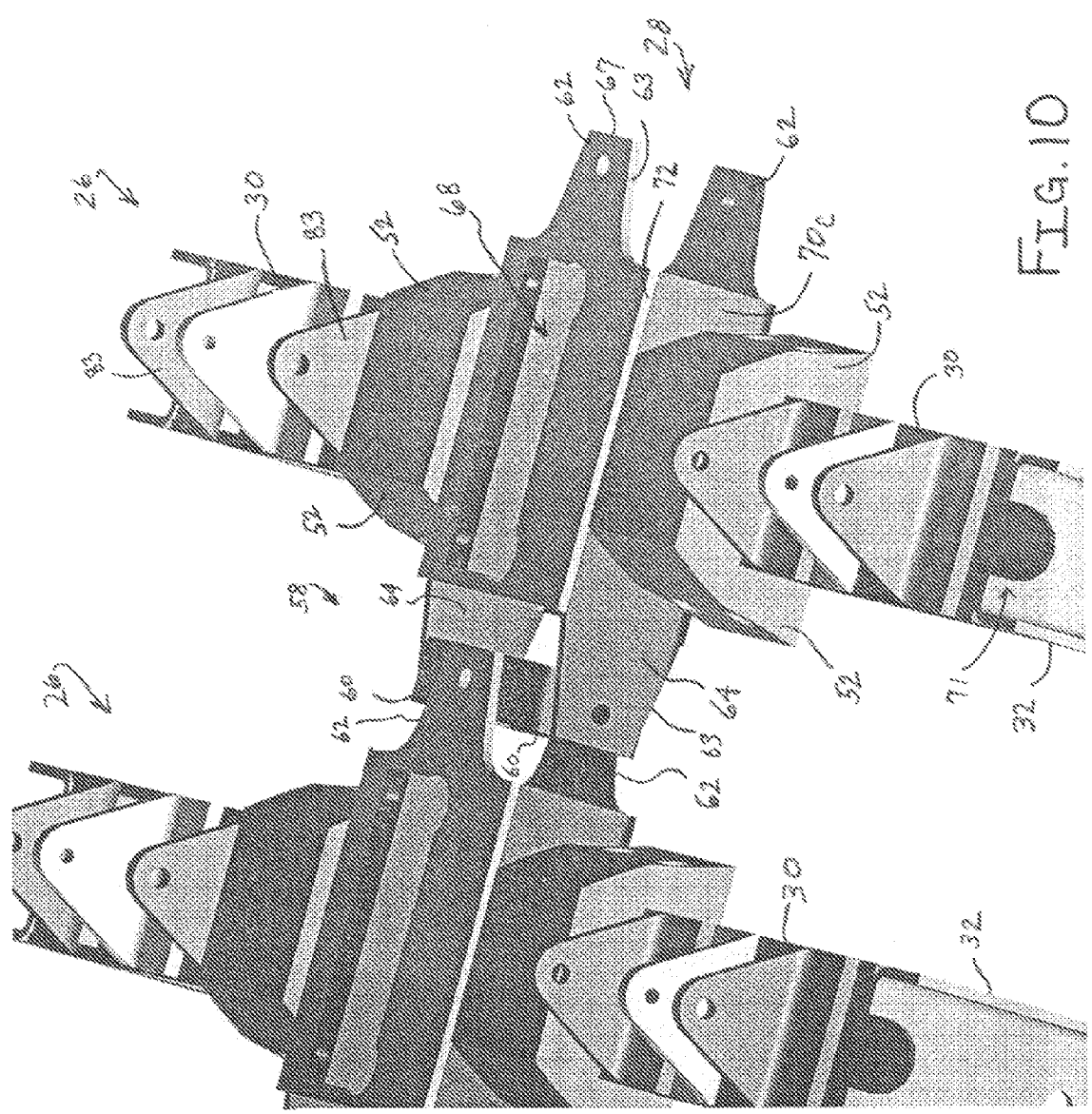
FIG. 10 is a partial bottom perspective view of components of a conveyor of the present invention.

Conveying element 26 includes generally opposing front tabs 62 and generally opposing rear tabs 64. Tabs 62, 64 extend generally from box plates 70, 72. Tabs 62 are generally positioned normal to tabs 64 as may be appreciated. Rear tabs 64 align with yoke 60 at faces 73b, 73d while adjacent conveying element 26 has front tabs 62 which align with yoke 60 at faces 73a, 73c. Tabs 62, 64 are aligned and rotatably fastened at apertures 65 and through box fastener apertures 77b, 77d. As best shown in FIG. 9 and FIG. 10, tabs 62, 64 are tapered (such as at tapered edge 63) to accommodate articulation or swivel to achieve a desired range of motion of respective conveying elements 26. Preferably terminating end 67 has a width w less than a width z of harness box 28 and yoke 60. It may be appreciated that adjacent conveying elements may freely articulate while at the same time cables (cables not shown) may be strung through yoke channel 61 and box channel 78. Preferably wire harness box 28 includes access port 68 to accommodate access to cabling that runs through wire harness box 28. Preferably, harness box 28 is modular such that successive harness boxes 28 may be connected to and/or interchanged with adjacent harness boxes 28.

FIG. 10 is a bottom perspective view of the invention with various parts removed for clarity. A variety of roller flanges 83 project from an underside of rails 30 for attachment of rollers 36, 75. Shoulders 32 extend upward from rails 30. While rack tooth 52 is shown to straddle rail 30, it may be appreciated that rails 30 may be of wider dimension so that rack tooth 52 is an integral part of rail 30.

Figure 7:
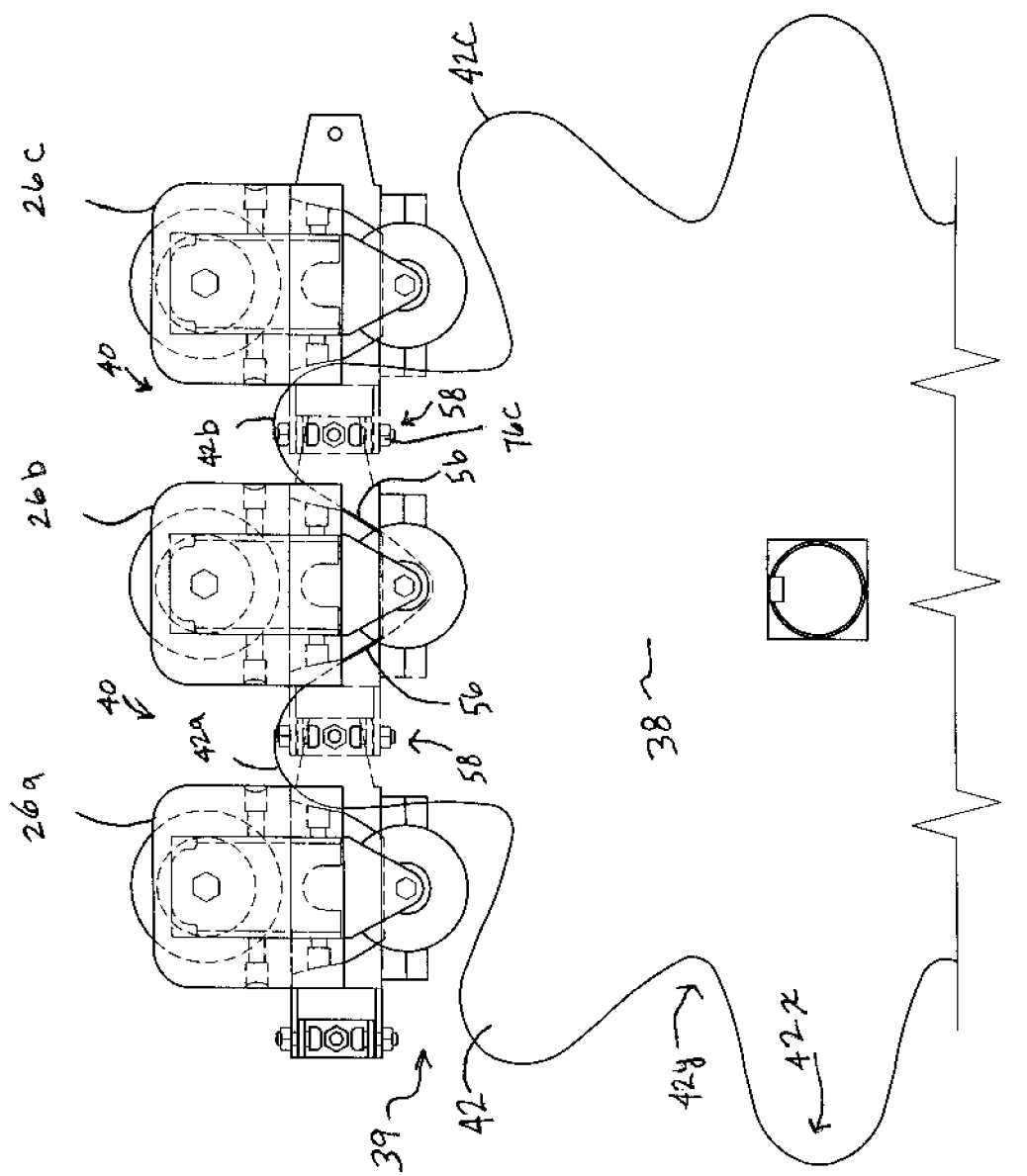
FIG. 7 is a partial elevation view of the conveyor of FIG. 3 with portions removed for clarity.
Figure 8:
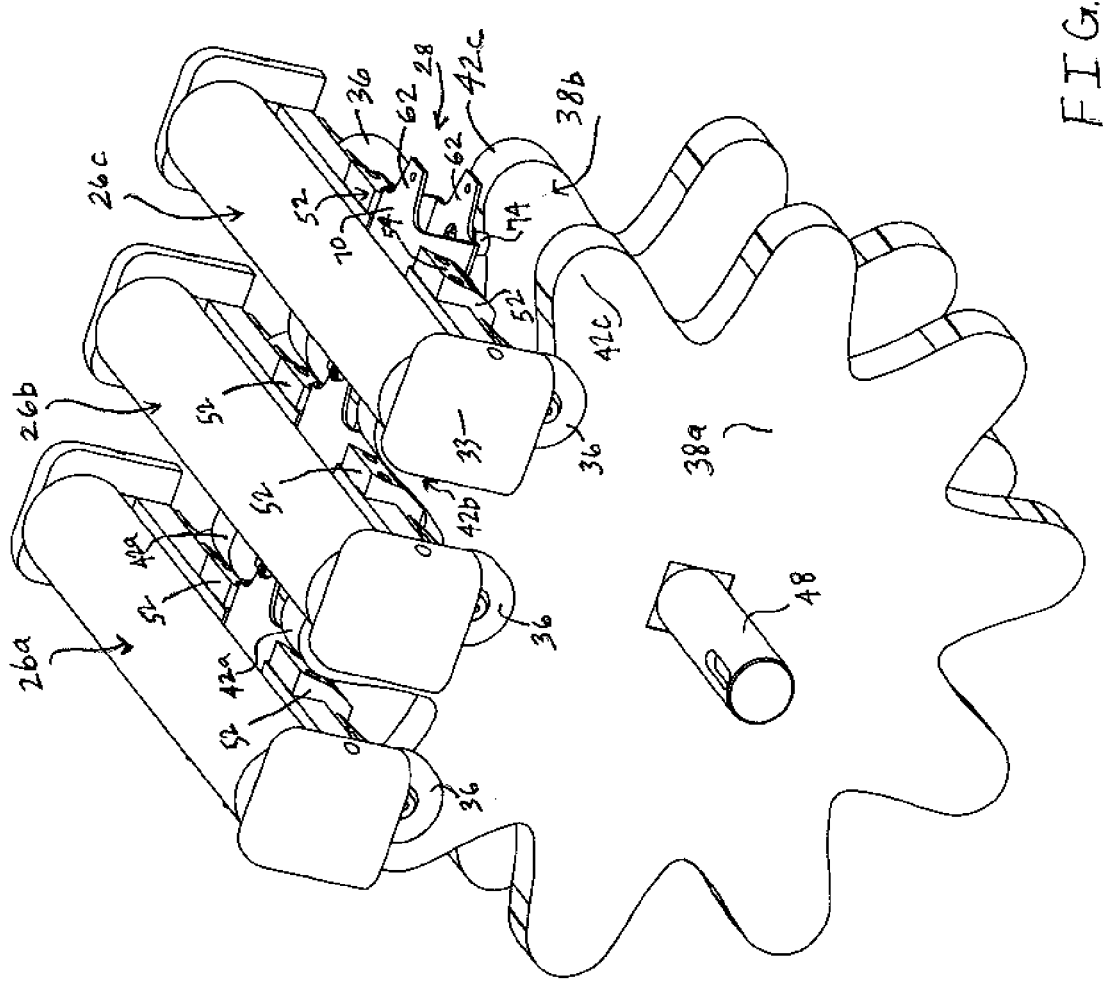
FIG. 8 is a partial perspective view of a conveyor of the present invention with portions removed for clarity.

As shown in FIG. 7, FIG. 8 and FIG. 9, conveying elements 26a, 26b, and 26c are connected with respective universal joints 58. Finger 42a inserts into groove 40. A portion of finger 42a engages rack lower wall 56 of element 26b while another portion of finger 42a preferably engages with rack wall 54 of element 26a. Likewise, finger 42b engages with rack lower wall 56 of element 26b while another portion of finger 42b preferably engages with rack wall 54 of element 26c. It may be appreciated that as gear 38 rotates either clockwise or counter-clockwise, various portions of fingers 42 will engage with various portions of rack teeth 52 to thereby drive or otherwise retract or extract elements 26. Fingers 42 are designed with crests 42x and valleys 42y to match grooves 40 and rack teeth 52 for a smooth driving motion of elements 26.

Figure 3B:
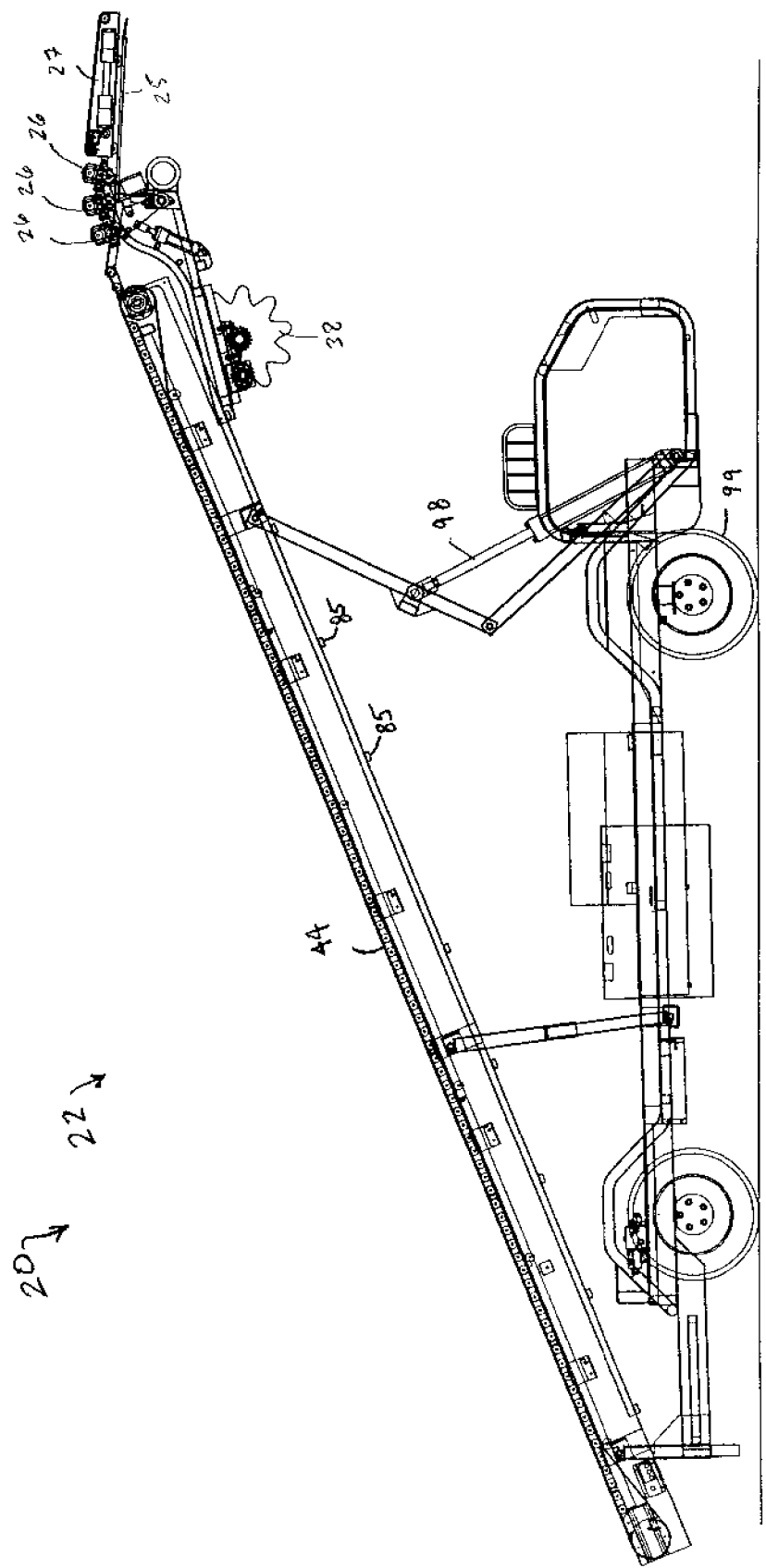
FIG. 3B is an elevation view of the conveyor of FIG. 1 with belt conveyor elevated and with portions of the unit removed for clarity.
Figure 4:
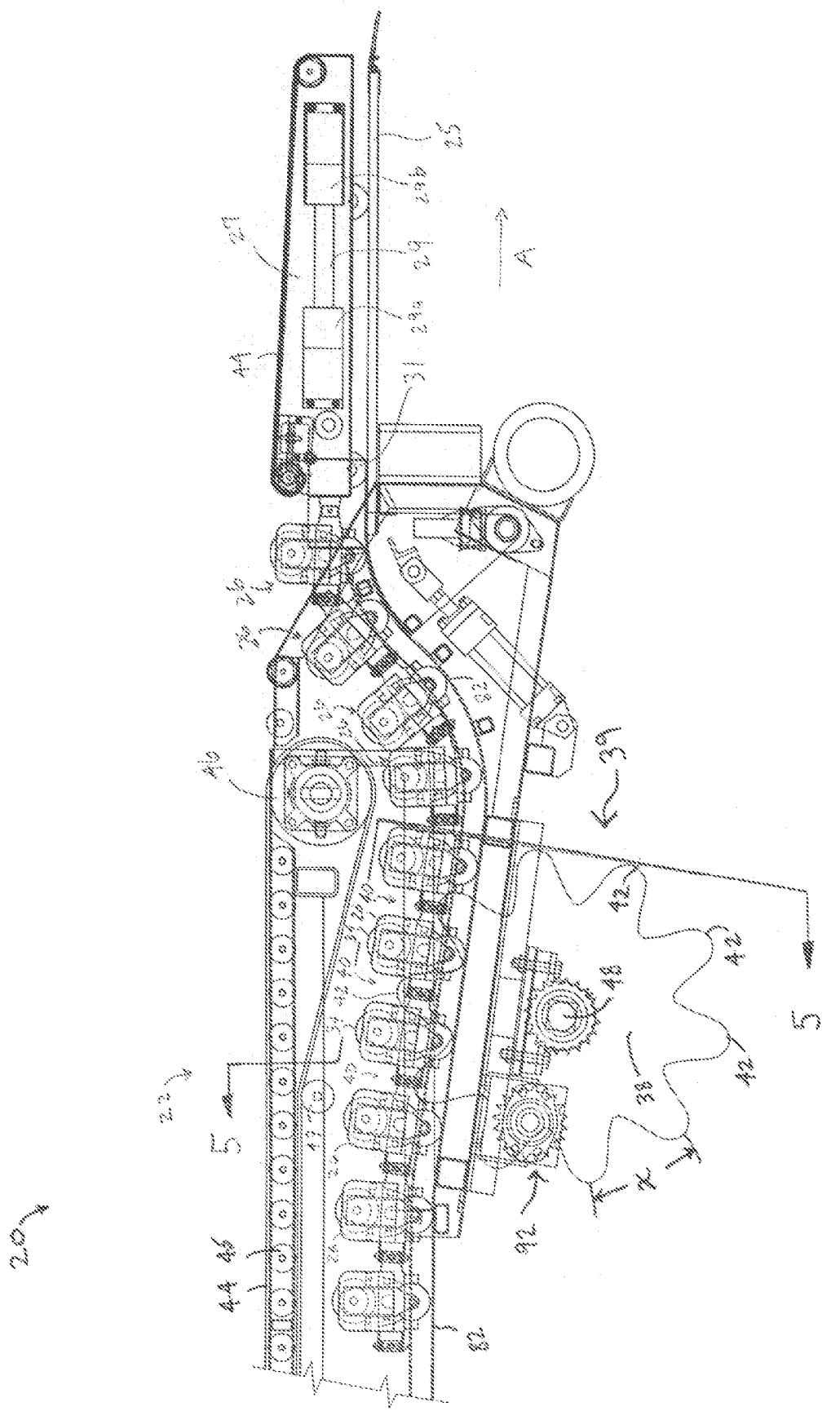
FIG. 4 is a partial elevation view of the conveyor of FIG. 3.

FIG. 3B shows one typical example of a conveyor 20 where base 22 is a belt conveyor having scissors lift. Scissors lift 20 includes an actuator 98 for inclining conveyor belt 44 relative to a relatively horizontal position as shown in FIG. 3A. Conveyor 20 preferably is a vehicle and includes wheels 99 or other transporting means to transport conveyor 20 from place to place. Preferably conveyor includes docking platform 25 upon which front end conveying element 27 may rest. Preferably docking platform 25 rotates to accommodate leveling of element 27 and to allow for flush engagement of platform 25 with an aircraft cargo floor or other surface. Preferably, conveyor includes a leveling sensor and/or controller to automatically adjust the level of platform 25 to accommodate placement at the area of entry of platform 25 into the aircraft. Leveling mechanism includes a hydraulic bleed to allow platform 25 to move freely or to float into desired position. Once platform is sensed to be in a level position relative to a cargo entry area, elevation movement of conveyor 22, such as a scissors conveyor, ceases automatically.

Preferably element 27 includes an endless belt conveyor 44, which also may preferably include a bag table (not shown) to be raised or lowered to accommodate various angles for unloading cargo. Handle 29 slides within handle blocks 29a, 29b to operate extraction or retraction of elements 26, 27. As a user grasps and slides handle 29 in the direction of arrow A (FIG. 4), switches or controls activate drive means 39 which operates by rotating in a clockwise direction to extend element 27 in the direction of arrow A. Element 27 preferably includes drive roller 31 which preferably extends substantially the width of element 27 and rotates as handle 29 slides. Drive roller 31 is preferably powered by an electric drive motor. Drive roller 31 assist in smooth extraction of elements 26 which may otherwise compress upon adjacent elements 26 causing retractable conveyor 24 to otherwise buckle or misalign. In retraction mode, drive roller 31 may be unpowered and rotate freely to allow drive means 38 to control retraction. Element 27 may also include a control area (not shown) for housing control mechanisms and systems for operation of the various belts, rollers and drive mechanisms of conveyor 20.

In operation, after conveyor 20 is positioned adjacent an aircraft and platform 25 is leveled to the cargo hold area, a user extracts retractable conveyor 24 by grasping handle 29 and extending the conveyor to the cargo hold area. Handle 29 operates drive means 39 which powers, for instance, spur gear 38. As spur gear 38 rotates, individual fingers 42 engage with respective grooves 40 defined by the plurality of conveying elements 26. Fingers 42 abut rack teeth 52 for efficient driving of elements 26. Guiding roller 74 and guidance rollers 75 operate to maintain elements 26 on track 82. Individual elements 26 swivel as they travel over undulations such as the curved track 82 and further swivel from side-to-side as desired to enter various cargo hold areas. The method of operation includes providing a conveyor 20 as described herein, positioning the conveyor 20 adjacent an aircraft, extracting conveyor 24, and placing cargo upon conveyor 24.

Figure 11:
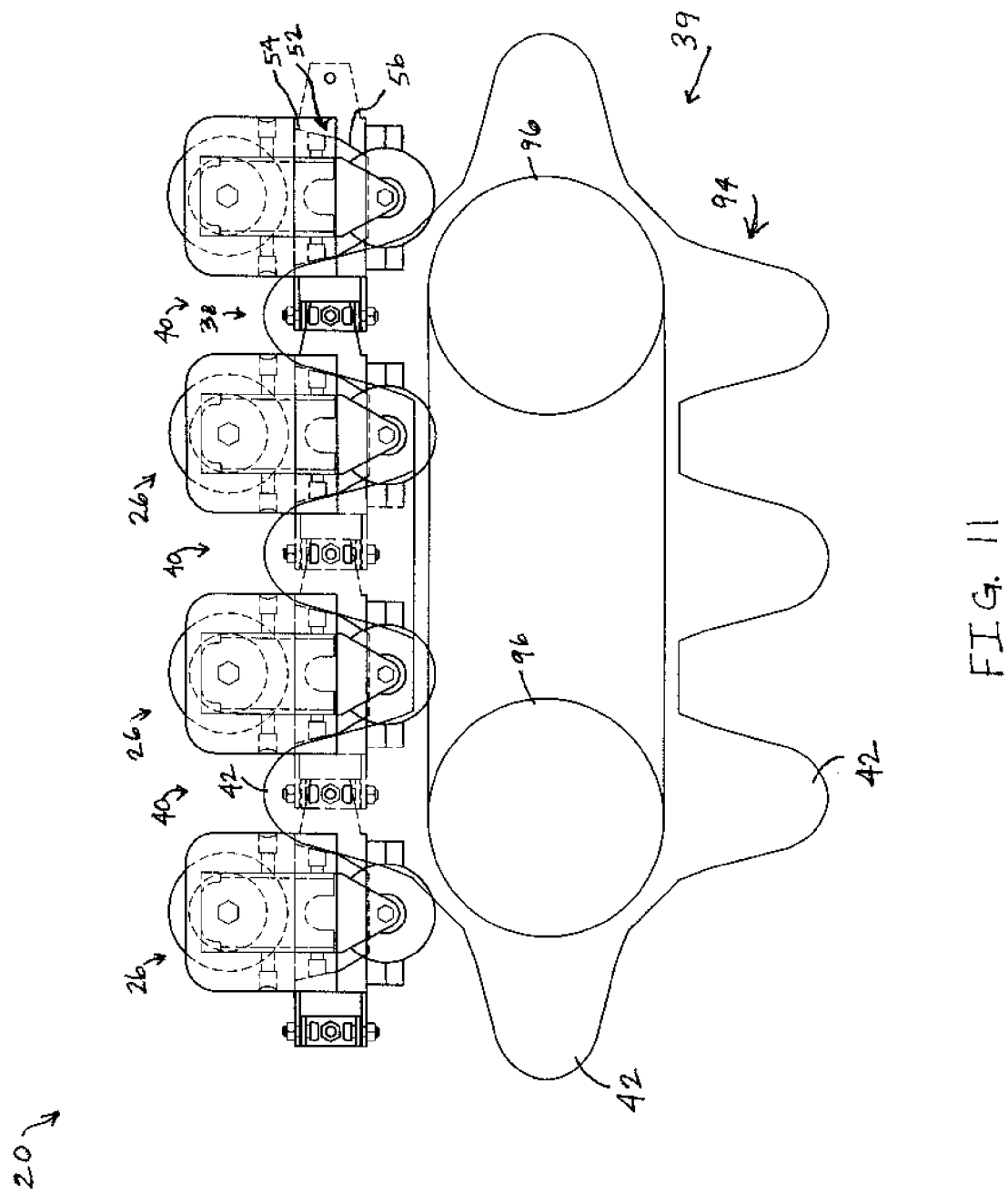
FIG. 11 is a partial elevation view of a further aspect of the present invention.

Referring to FIG. 11, a further aspect of the conveyor 20 is shown. Clog belt 94 rotates about clog belt shaft 96 where fingers 42 successively engage within respective grooves 40 to drive conveying elements 26. Fingers 42 are configured to engage with rack tooth 52 and to match generally concave rack wall 54 and generally convex rack lower wall 55. A pair of clog belts 94 may be provided on either side of wire harness box 28 so as to have fingers 42 engage with at least two rack tooth 52 of each supporting rail 30. Clog belt 94 may have multiple fingers 42 and may span to engage with more than one groove 40. Clog belt 94 is preferably made of a rubberized material so that fingers 42 which operate similar to treads may flex as they travel around clog belt shaft 96 into driving position.

Figure 12:
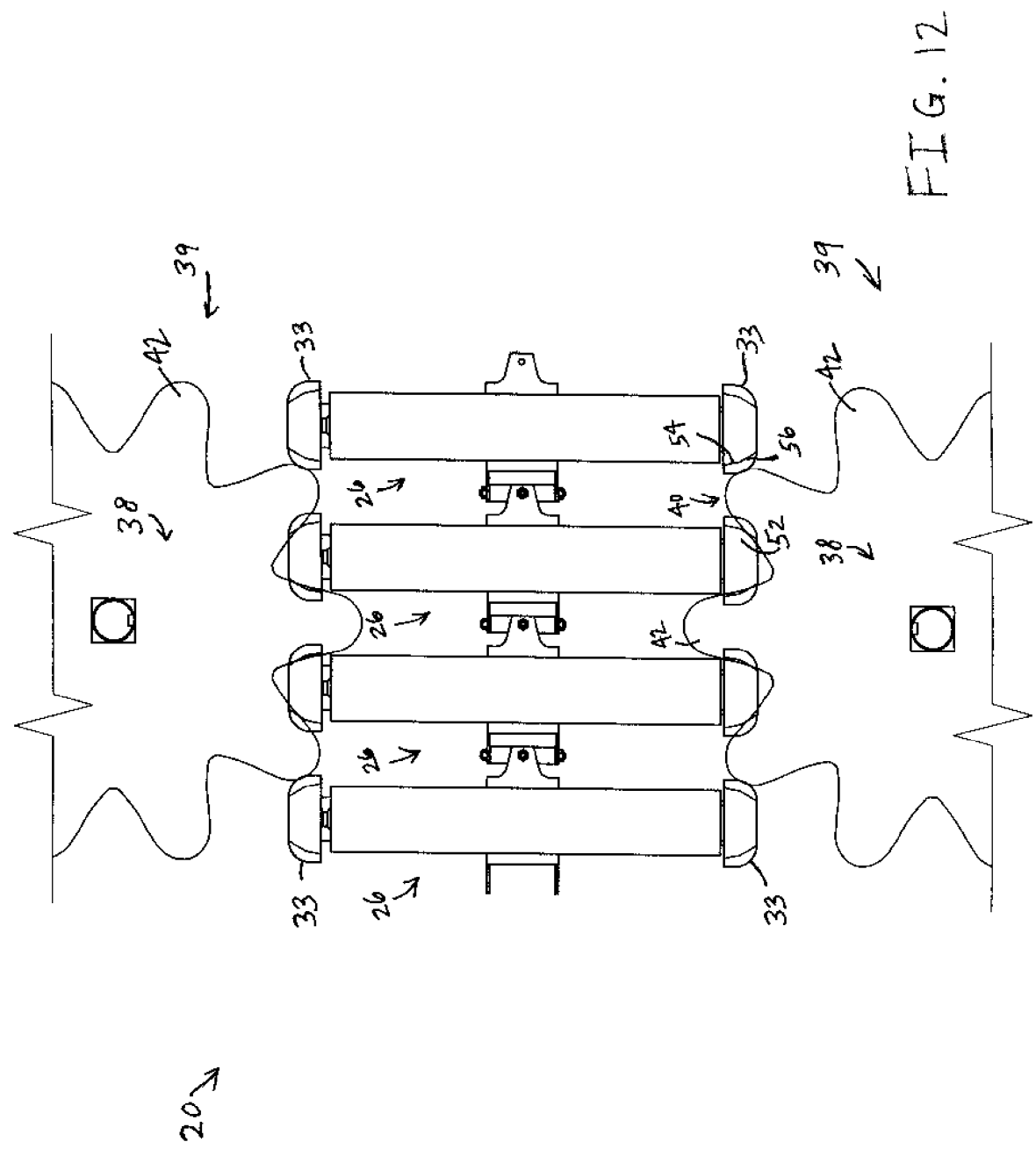
FIG. 12 is a partial plan view of a further aspect of the conveyor of the present invention.
Figure 13:
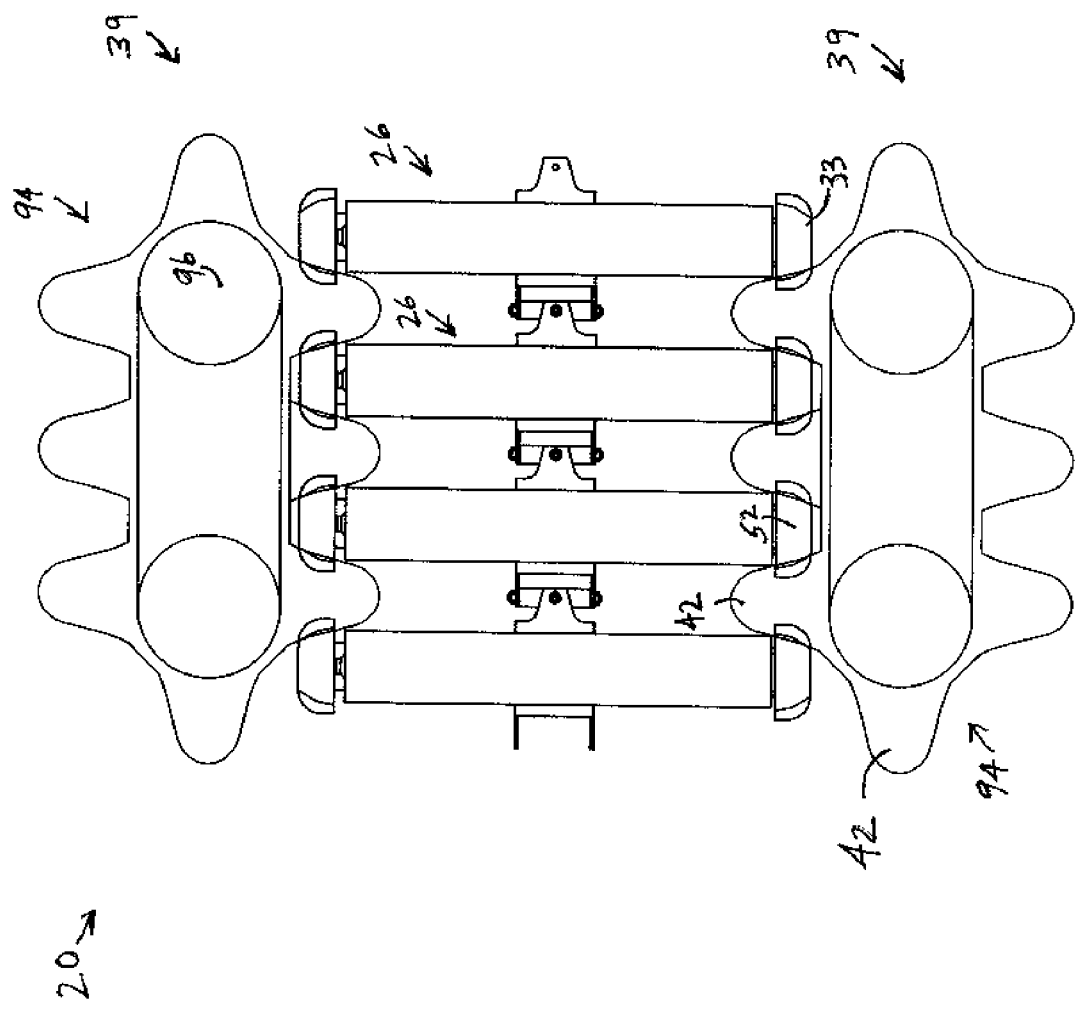
FIG. 13 is a partial plan view of a further aspect of the conveyor of the present invention.

Referring to FIG. 12, a further aspect of the conveyor 20 is shown. Drive means 39 includes a pair of spaced apart spur gears 38 arranged at respective ends of elements 26. Bumpers 33 operate as rack tooth 52 having rack wall 54 and rack lower wall 56. Fingers 42 engage bumpers 33 to drive elements 26. As spur gears 38 rotate, elements 26 are extended from or retracted to base 20. With reference to FIG. 13, a further aspect of the invention is shown, where drive means 39 includes clog belts 94. As belts 94 travel about shaft 96, fingers 42 engage with bumpers 33 having rack tooth 52 to drive elements 26.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated.

What is claimed is:

1. A conveying device comprising:
    at least a first conveying element and a second conveying element, each of said first and said second conveying element comprising:
        a wire harness box; and
        a cargo roller positioned above said wire harness box; and
    a universal joint having at least two degrees of freedom, said universal joint connecting said wire harness box of said first conveying element with said wire harness box of said second conveying element.

2. The device of claim 1 wherein said universal joint includes a generally rectangular hollow yoke, said yoke having opposing yoke faces.

3. The device of claim 2 wherein each of said yoke faces includes at least one box fastener aperture.

4. The device of claim 3 wherein each of said box fastener apertures is positioned substantially at a center portion of each of said yoke faces.

5. The device of claim 3 wherein said yoke has four faces and wherein at least two of said apertures define a vertical axis and at least two of said apertures defines a horizontal axis.

6. The device of claim 5 wherein said vertical axis and said horizontal axis lie on a common plane.

7. The device of claim 5 wherein said yoke defines a yoke channel, said vertical axis and said horizontal axis intersect at a center portion of said yoke channel.

8. The device of claim 1 wherein said wire harness box includes opposing box plates, said wire harness box including a pair of front tabs and a pair of rear tabs, said front tabs extending from box plates generally normal to said rear tabs.

9. The device of claim 8 wherein said rear tabs of said first conveying element are positioned generally normal to said front tabs of said second conveying element.

10. The device of claim 9 further comprising a rectangular hollow yoke, each of said front tabs and of said rear tabs rotatably fastened to said yoke.

11. The device of claim 10 wherein each of said tabs is tapered.

12. The device of claim 10 wherein said yoke has four faces, said yoke having an outer dimension less than an inner dimension of said wire harness box.

13. The device of claim 1 wherein said universal joint has three degrees of freedom.

14. The device of claim 5 wherein at least two of said apertures include a slot.

15. The device of claim 5 wherein at least two of said apertures are elongated.

16. The device of claim 1 wherein said universal joint includes means for pivoting about at least two axes.

17. The device of claim 16 wherein said means for pivoting includes a yoke.

18. The device of claim 16 wherein said means for pivoting includes a yoke having four faces and at least four apertures, and wherein at least two of said apertures define a vertically rotating axis and at least two of said apertures defines a horizontally rotating axis.

19. A conveying device comprising:
    at least a first conveying element and a second conveying element, each of said first and said second conveying element comprising:
        a wire harness box having opposing box plates, said wire harness box including a pair of front tabs and a pair of rear tabs, said front tabs extending from box plates generally normal to said rear tabs; and a cargo roller positioned above said wire harness box; and a universal joint having at least two degrees of freedom, said universal joint including a rectangular hollow yoke, each of said front tabs of said at least first conveying element and each of said rear tabs of said second conveying element rotatably fastened to said yoke.

20. A conveying device comprising:

a base;

a retractable conveyor extendable from said base, said conveyor comprising:

at least a first conveying element and a second conveying element, each of said conveying elements comprising:

a wire harness box having opposing box plates, said wire harness box including a pair of front tabs and a pair of rear tabs, said front tabs extending from box plates generally normal to said rear tabs; and a cargo roller positioned above said wire harness box; and a universal joint having at least two degrees of freedom, said universal joint including a rectangular hollow yoke, each of said front tabs of said at least first conveying element and each of said rear tabs of said second conveying element rotatably fastened to said yoke.

\* \* \* \* \*